Feb. 22, 1944.   G. B. HILL   2,342,282
HARVESTER PLATFORM
Filed July 23, 1942   2 Sheets-Sheet 1

INVENTOR
George B. Hill
BY
ATTORNEYS

Feb. 22, 1944.  G. B. HILL  2,342,282
HARVESTER PLATFORM
Filed July 23, 1942  2 Sheets-Sheet 2
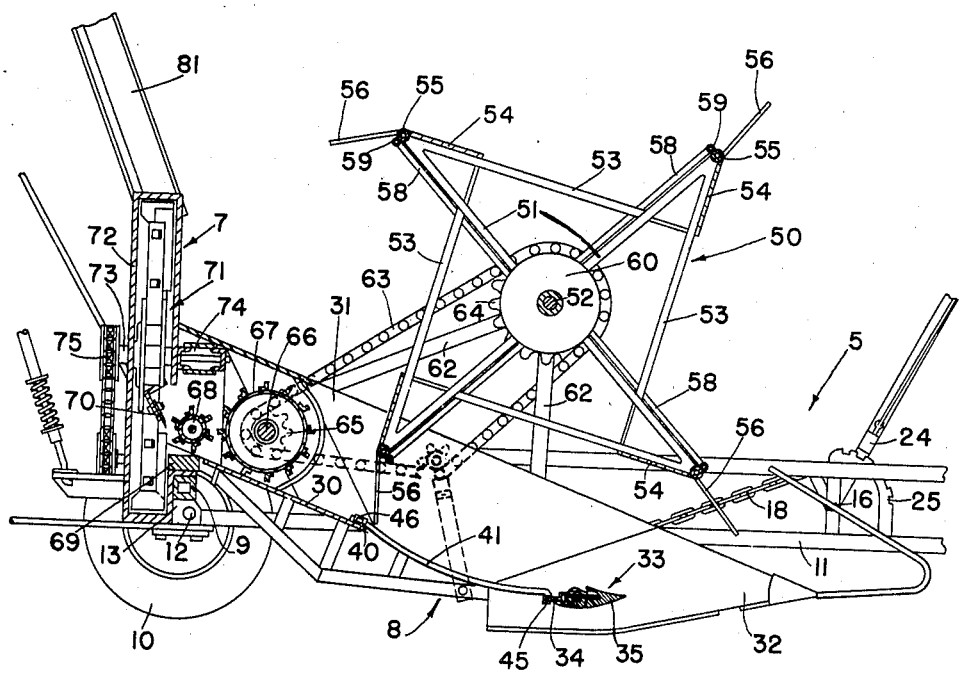
FIG. 2
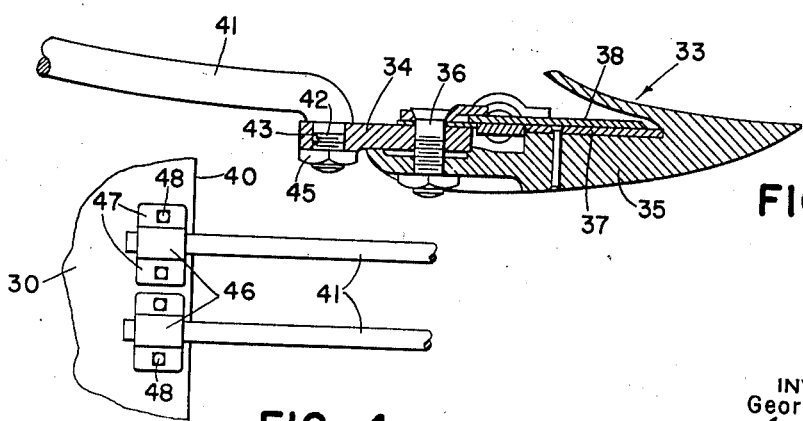
FIG. 3
FIG. 4
INVENTOR
George B. Hill
BY
ATTORNEYS Patented Feb. 22, 1944

2,342,282

UNITED STATES PATENT OFFICE 2,342,282

HARVESTER PLATFORM

George B. Hill, Ottumwa, Iowa, assignor to Dain Manufacturing Company of Iowa, Ottumwa, Iowa, a corporation of Iowa Application July 23, 1942, Serial No. 452,109

1 Claim. (Cl. 56—158)

The present invention relates to harvester platforms, and is particularly applicable to a platform for a green hay harvester of the type which gathers green grass from the field, chops it into small pieces, and loads it into a wagon or truck. When a harvester of this type operates in stony fields, it frequently occurs that stones are gathered with the grass, and are conveyed to the chopping knives, causing damage to the edges of the knife blades. The principal object of the present invention relates to the provision of a harvester platform having means for eliminating the stones from the grass, hay or other crops, before the latter is fed into the chopping knives.

In the accomplishment of this object I have provided a grating in the bottom of the pan of the platform, over which the harvested crops are moved, and through which drop any stones of appreciable size, which might ruin or damage the chopping knives.

Other objects and advantages of my invention will be apparent to those skilled in the art after consideration of the following description in which reference is had to the drawings appended hereto, in which Figure 1 is a plan view of a green hay harvesting machine having a platform embodying the principles of my invention;

Figure 2 is an elevational view of the harvester taken in section along a line 2—2 in Figure 1;

Figure 3 is a fragmentary detail view showing a section through the cutter bar and indicating the manner of attaching the grating rods to the cutter bar; and Figure 4 is a fragmentary plan view showing the manner of connecting the rear ends of the grating rods to the bottom pan of the harvester platform.

Figure 1:
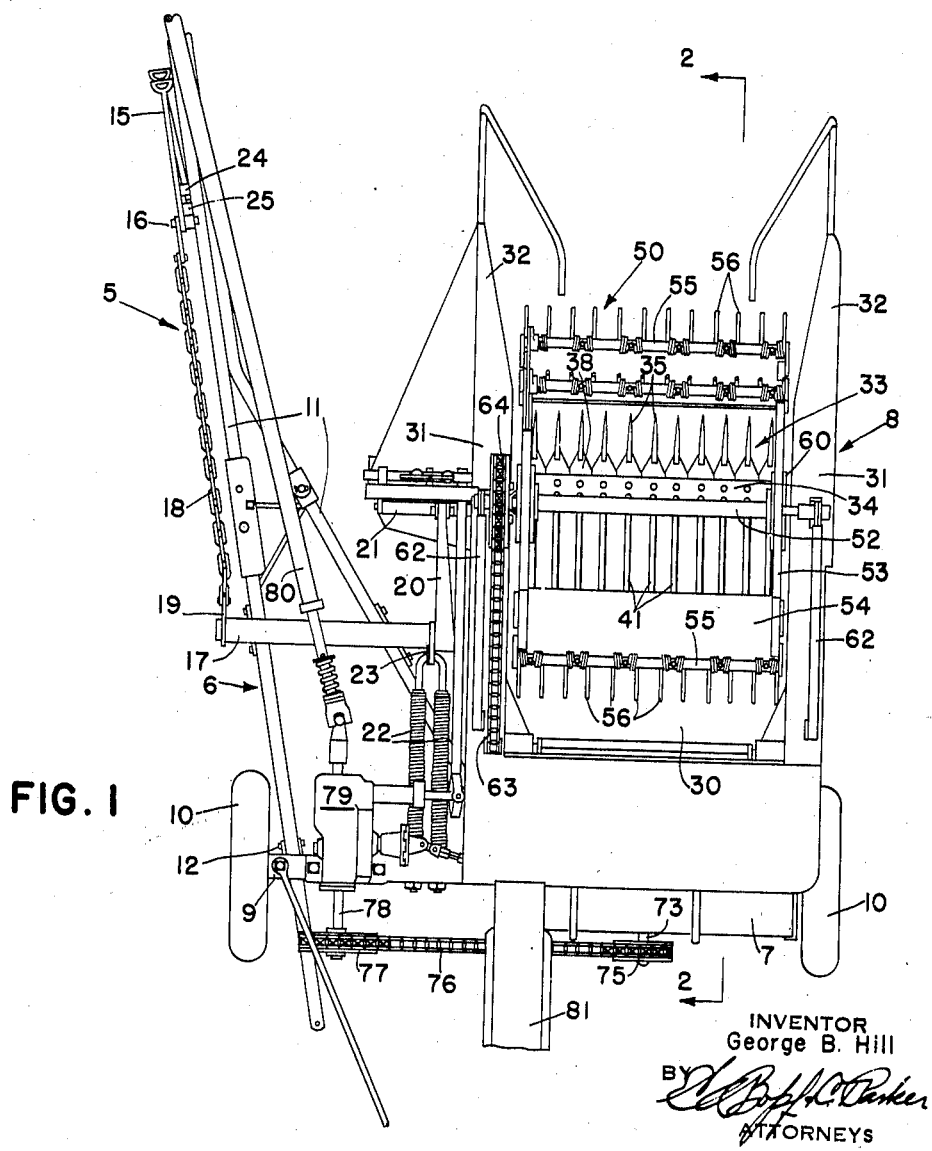

Referring now to the drawings, the green grass harvester, indicated in its entirety by reference numeral 5, comprises a structural supporting frame 6, a flywheel type chopper 7, and a harvester platform 8. The supporting frame 6 comprises a main transverse frame member 9 carried at opposite ends thereof, respectively, on a pair of laterally spaced ground wheels 10, and a forwardly and laterally extending draft frame including a pair of forwardly converging frame members 11, the forward end of which is adapted to be connected to and supported on a tractor drawbar (not shown). The draft frame members 11 are connected by pivot joints 12 to a pair of brackets 13 depending from the transverse frame member 9. Since the chopper 7 and platform 8 are rigidly connected together and to the transverse frame member 9, the forward end of the platform may be raised and lowered by tilting the entire platform, chopper, and main transverse beam 9 about the axis of the pivot members 12, relative to the draft frame. The platform is adjusted by means of a hand lever 15 mounted on the draft frame 6 for swinging movement about a pivot bolt 16, and is connected to a rock shaft 17 through a chain 18 and arm 19. Another arm 20 on the rock shaft 17 is connected through a link 21 to the side of the platform 8. A counter-balancing spring 22 is connected to a third arm 23 on the rock shaft 17 and aids in lifting the platform 8. The latter is secured in adjusted position by means of a hand operated latch 24 on the lever 15, which engages a notched sector 25 on the draft frame 6.

The harvester platform 8 is of the conventional "scoop shovel" type, comprising a bottom pan 30 and a pair of side walls 31, each of which terminates in a forwardly extending divider 32.

A crop gathering device, indicated generally by reference numeral 33, is disposed adjacent the forward end of the platform, and comprises a transverse cutter bar 34 of a conventional type, along the forward edge of which is secured a plurality of forwardly extending knife guard fingers 35 by means of bolts 36. A plurality of conventional ledger plates 37 are supported on the guards 35, on which a sickle 38 is reciprocably slidable, and driven by any suitable means.

The forward edge 40 of the bottom pan 30 terminates along a transverse line spaced at a substantial distance rearwardly from the rear of the cutter bar 34 to produce an extended opening therebetween. This opening is traversed by a plurality of fore and aft extending, laterally spaced rods or bars 41, forming a grating over the opening, and over which the harvested crops are adapted to slide between the crop gathering device 33 and the bottom pan 30 of the platform. The forward ends of the rods 41 are each bent downwardly and are machined to a smaller diameter, as at 42. These reduced end portions are inserted downwardly through suitable apertures 43 along the rear edge of the cutter bar 34, and are secured thereto by nuts 45. The rear ends of the bars 41 are secured to the bottom pan 30 adjacent the forward edge 40 thereof by means of U-shaped clips 46, which straddle the bars 41 and have a pair of laterally extending flange portions 47 which are secured to the bottom pan 30 by bolts 48, respectively.

The grass or other crop is severed by the action of the sickle 38 upon the ledger plates 37 in the usual manner, and the harvested material is swept rearwardly and upwardly over the longitudinal bars 41 by means of a reel, indicated generally by reference numeral 50. The reel 50 comprises a pair of laterally spaced spiders including radially extending arms 51 mounted on a reel shaft 52. Each of the arms 51 is braced to the adjacent arm by means of a bracing member 53, and corresponding arms at opposite ends of the reel are interconnected by reel bats 54, secured to the bracing members 53 at opposite ends of the bats, respectively. At the outer ends of the arms are journaled a plurality of transversely extending shafts 55, on each of which are mounted a plurality of spring fingers 56, which extend outwardly for the purpose of engaging harvested crop material that falls upon the cutter bar 34, and sweeps the same upwardly and rearwardly over the bars 41 and bottom pan 30. The bars 41 are curved upwardly and rearwardly from the cutter bar 34 in arcs about the axis of rotation of the reel shaft 52, so that the crop engaging fingers 56 follow closely the bars along their entire length, thus efficiently sweep the crop material rearwardly and upwardly along the platform.

The crops for which my invention is particularly adapted are those which tend to cling or mat together, such as grass, alfalfa, and the like, and the bars 41 are spaced sufficiently close together to prevent an appreciable amount of crop material from falling therebetween, but yet are far enough apart so that they will pass stones of sufficient diameter to injure the chopping mechanism 7. Stones of this size are heavy enough to fall through the crop and between the bars 41 to the ground.

The crop engaging fingers 56 are of the feathering type, which extend radially outwardly as they sweep over the cutter bar and over the bars 41, but are swung angularly as the reel arms move upwardly behind the rear ends of the bars 41, so that the fingers are withdrawn from the crop material in a substantially vertical position, in order to prevent carrying the crop material upwardly and over the reel, in a manner well-known to those skilled in the art. The details of the reel mechanism are not a part of the present invention, and any type of reel can be used that is suitable for the purpose. For this disclosure, it is deemed sufficient to add that the shafts 55 on which the fingers 56 are mounted, are rocked angularly by means of control rods 58, connected at their outer ends to crank arms 59, fixed to the shafts 55, respectively, and the inner ends of the control rods 58 engage a suitable cam mechanism (not shown) disposed within a housing 60.

The reel 50 is mounted on supporting arms 62, which are carried on the side walls 31 of the platform, and the reel is driven by means of a drive chain 63 trained over a sprocket 64 and driven from a sprocket 65, fixed to the shaft 66 of a compressor roller 67 at the rear end of the platform.

The harvested crop material is delivered by the fingers 56 to the compressor roller 67, which strips the crops from the fingers 56 and passes it rearwardly and upwardly over the bottom pan 30 to a feeder roller 68 disposed above a stationary chopping bar 69, against which the chopping knives 70 of the chopping rotor 71 cooperate. The rotor 71 of the chopping mechanism 7 is disposed within a housing 72, supported on the main transverse frame member 9, and is carried on a shaft 73 journaled in a bearing 74 ahead of the housing 72. The rear end of the rotor shaft 73 extends rearwardly through the housing 72 and carries a drive sprocket 75, which is driven by a chain 76 from a sprocket 77 fixed to the rear end of a power shaft 78. The power shaft 78 extends rearwardly from a gear box 79, which is driven from a telescoping power shaft 80, which extends forwardly along the draft frame 6 to a suitable power connection with the power take-off shaft of the tractor, as is well-known to those skilled in the art.

After the crops are chopped by the chopping rotor 71, they are thrown by centrifugal force upwardly through a chute 81, to a truck or wagon.

I do not intend my invention to be limited to the precise details shown and described herein, except as specified in the claim which follows.

I claim:

A harvester platform of the scoop shovel type having a transverse cutter bar at the forward end thereof, a reciprocative sickle on said cutter bar and a bottom pan behind said cutter bar and spaced rearwardly therefrom to provide an opening behind said cutter bar, a plurality of laterally spaced bars traversing said opening and attached to said cutter bar at their forward ends and to said bottom pan at their rear ends, and a reel rotatably mounted over said platform and having crop engaging fingers for sweeping harvested crops over said cutter bar and grating to said pan, said bars being curved upwardly and rearwardly in an arc about the axis of rotation of said reel.

GEORGE B. HILL.